March 2, 1971     E. P. EMBREE     3,567,816
METHOD OF PRETENSIONING AND REINFORCING A CONCRETE CASTING
Filed April 10, 1969     3 Sheets-Sheet 1
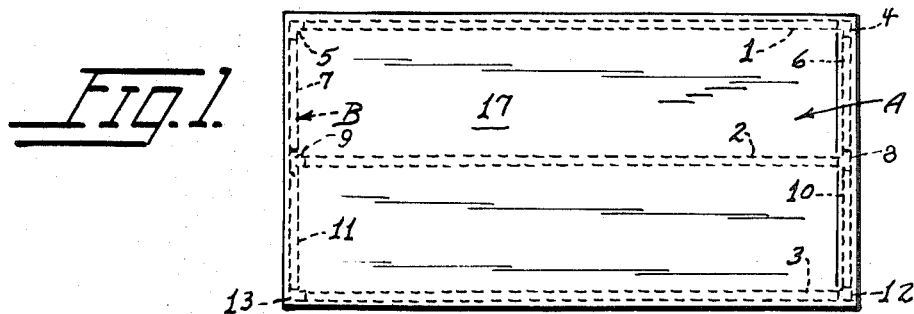
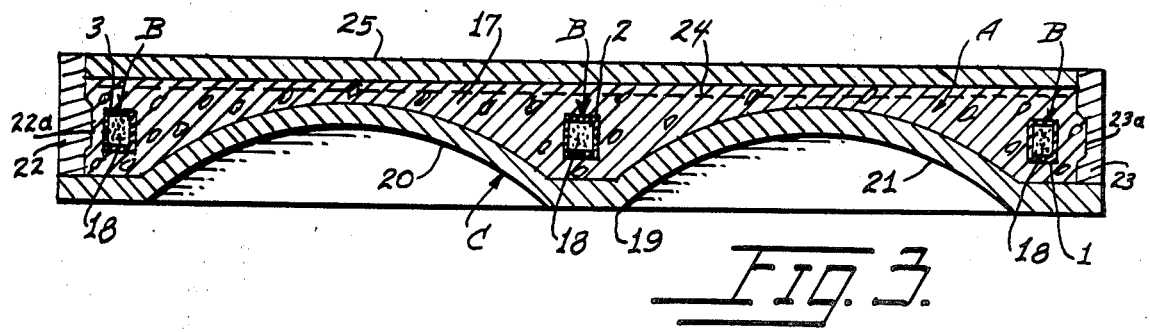
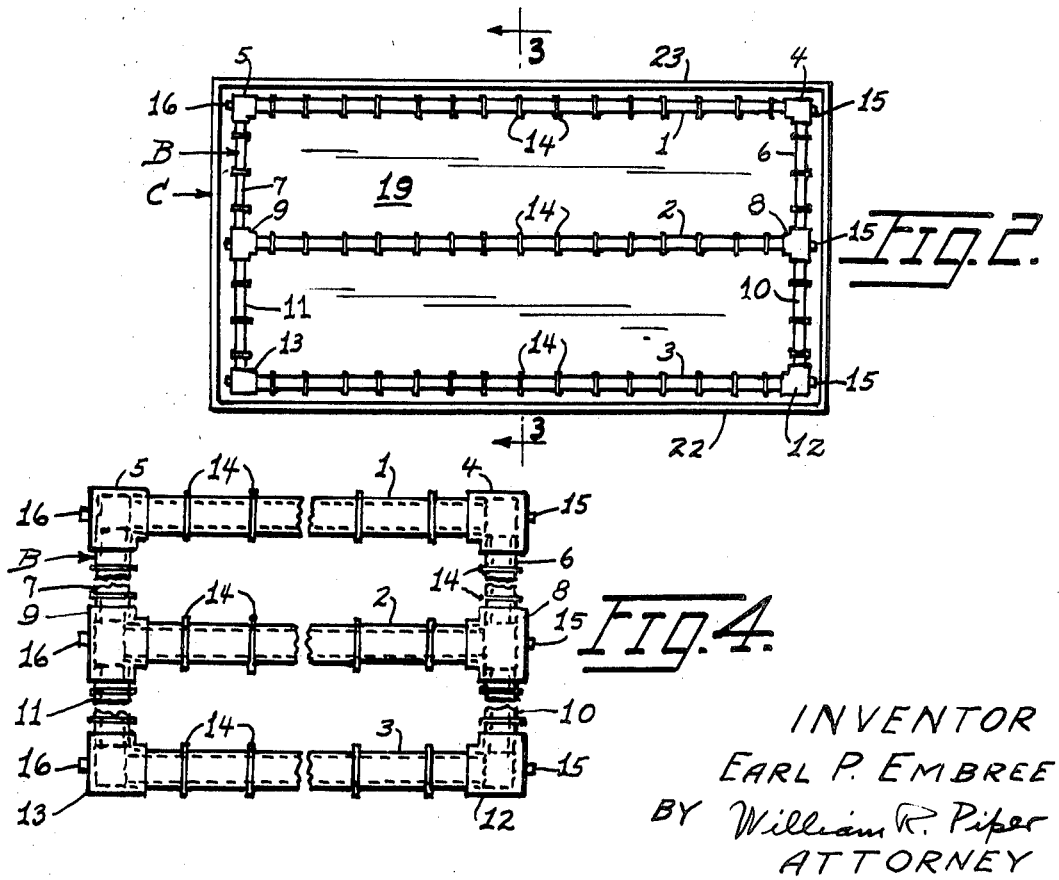
INVENTOR
EARL P. EMBREE
BY William R. Piper
ATTORNEY

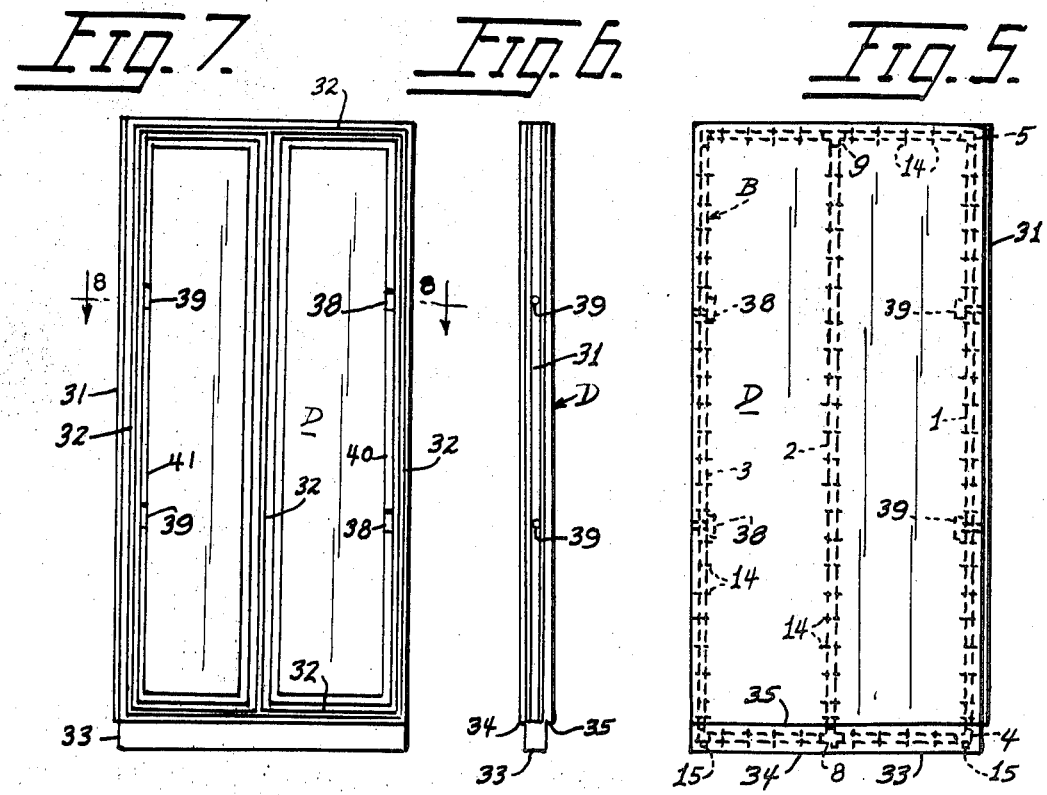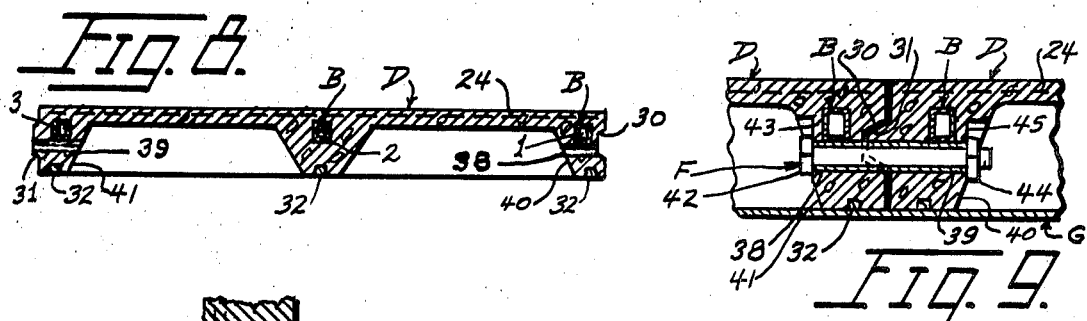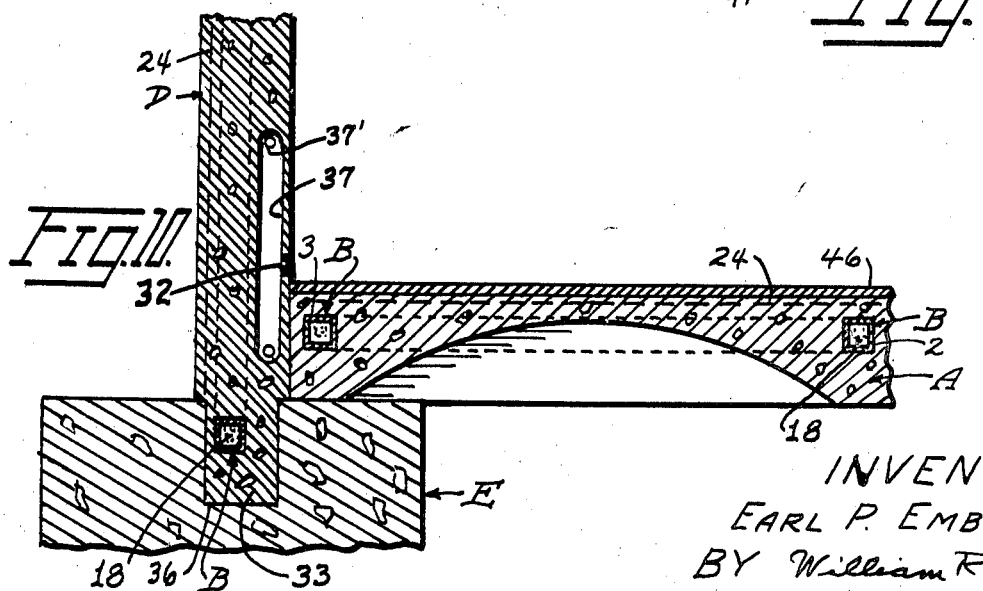

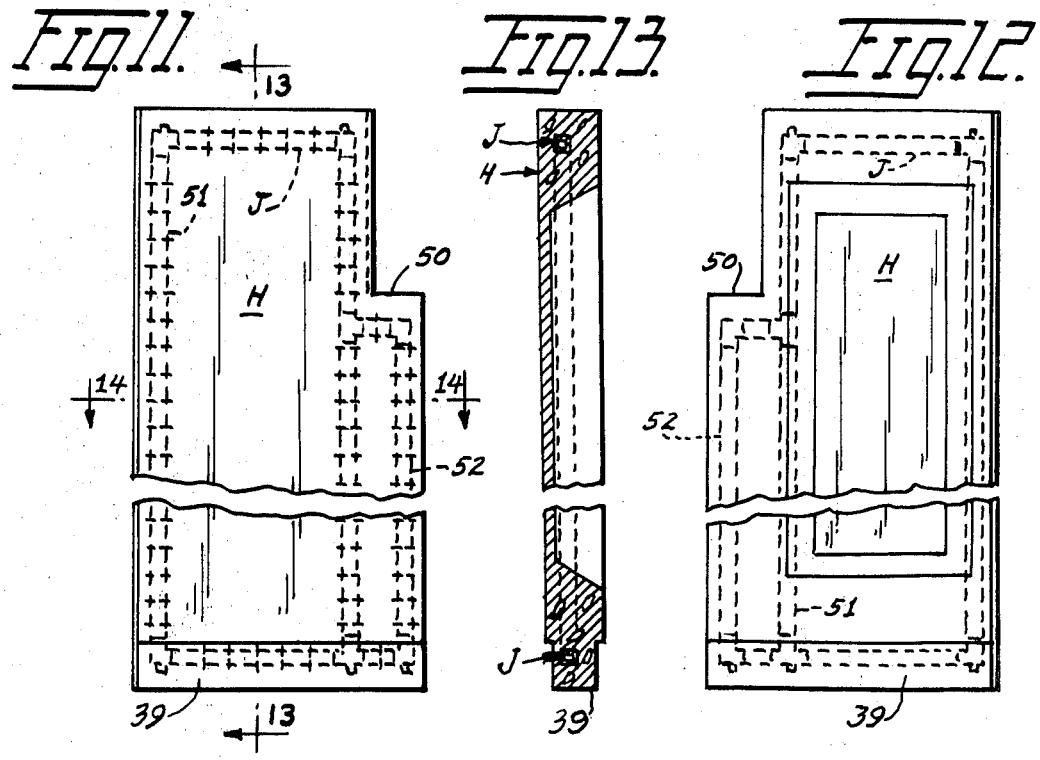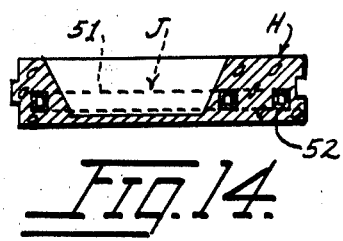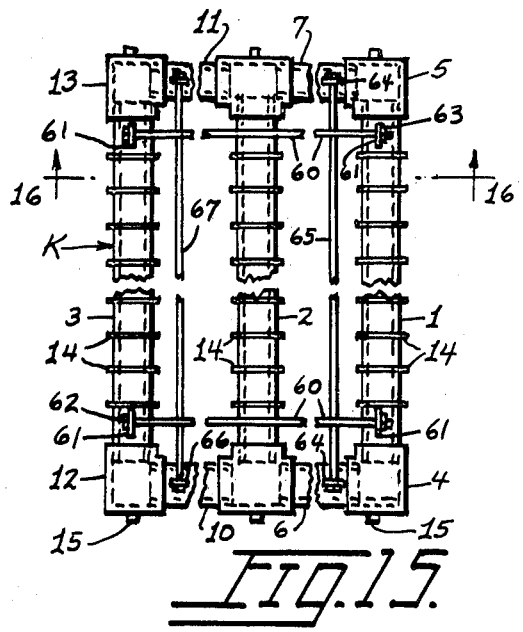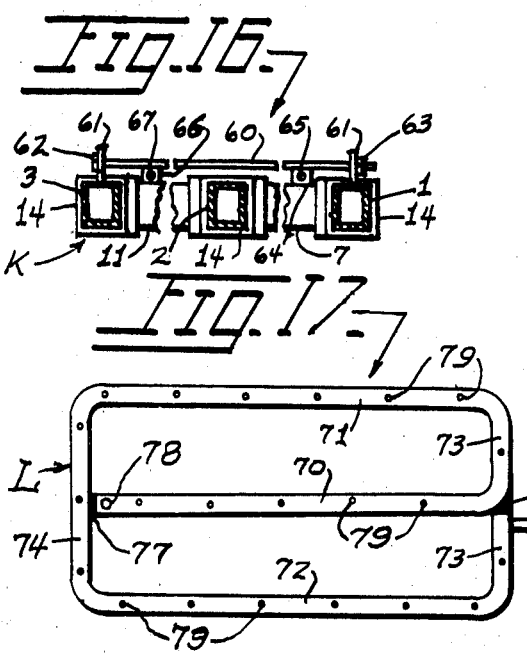

United States Patent Office 3,567,816
Patented Mar. 2, 1971

3,567,816
METHOD OF PRETENSIONING AND REINFORCING A CONCRETE CASTING
Earl P. Embree, 1493 Gardner Blvd.,
San Leandro, Calif. 94577
Filed Apr. 10, 1969, Ser. No. 814,989
Int. Cl. B28b *19/00;* E04c *3/10*
U.S. Cl. 264—228                                  2 Claims

ABSTRACT OF THE DISCLOSURE

A hollow reinforcing form with projections on its exterior surface, is filled with cement under pressure but when the cement sets it will contract and permit the hollow metal reinforcing form to return to normal position. The reinforcing form is then heated to about 150° F. and placed in a mold. The metal form will expand to a greater extent than the cement within it due to the heating. Concrete is poured around the reinforcing form and fills the mold so as to embed the reinforcing form. If necessary the mold can be vibrated for causing all voids in the mold to be filled with concrete. When the concrete sets, the reinforced concrete casting is removed from the mold and the hollow reinforcing material with the cement therewithin will return to ambient temperature. The hollow reinforcing material will tend to contract to a greater extent than the cement within it. The contracting form through its projections will tend to compress the concrete and will thus pretension the concrete casting. The cement in the hollow reinforcing material will add greater strength to the form and material.

BACKGROUND OF THE INVENTION

(1) Field of the invention

A hollow tubular reinforcing form is stronger than a solid form of the same material. Yet when the hollow reinforcing form is filled with cement or the like at a pressure between 100 and 150 p.s.i., the form will have a greater strength. Such a form can then be heated to about 150° F. to expand it to a greater extent than the cement within the form. While the form is in its expanded state, it is placed in a mold and concrete is poured into the mold to embed the form. When the concrete sets and the reinforcing form and the concrete return to ambient temperature, the tendency of the form to return to its original dimension will prestress the concrete casting.

(2) Description of prior art

The patent to Pierre C. Patin, No. 3,202,740, issued on Aug. 24, 1965 and is for a method of stressing the reinforcing members of reinforced concrete. The one or more tubes have plates connected at their ends and the tubes are elongated by an internal liquid pressure before the concrete is poured to embed the tubes. The plates engage with opposite sides of the concrete and after the latter has set, the liquid is released from the tubes and the tendency of the tubes to shorten in their overall lengths will prestress the concrete.

In the present invention the reinforcing tubular form is filled with cement to perform two functions: (1) the cement after setting will strengthen the form to a greater degree than if it were hollow; and (2) the tubular form is heated above the ambient temperature when the concrete is poured to enclose it. Therefore, the heated form when it returns to ambient temperature will prestress the concrete because of the contraction of the form. The patent in no way discloses this feature.

SUMMARY OF THE INVENTION

An object of my invention is to provide a hollow reinforcing form that is made stronger by being filled with cement and then the form is heated above ambient temperature so as to expand it to a greater extent than the cement within it at which time the form is embedded in concrete and the latter is allowed to set. Then when the form returns to the ambient temperature it will contract and prestress the concrete.

A further object of my invention is to provide a hollow reinforcing form that is designed to be used in a concrete floor, wall or ceiling panel of a building, where the panels are to be reinforced as well as prestressed.

BRIEF DESCRIPTION OF THE DRAWINGS

FIG. 1 is a bottom plan view of a reinforced concrete prestressed floor panel illustrating my improved design.

FIG. 2 shows the reinforcing metal form placed in a concrete-receiving mold preparatory to being embedded in concrete that will fill the mold and provide a reinforced floor panel.

FIG. 3 is an enlarged cross section taken along the line 3—3 of FIG. 2 and illustrates the reinforcing form filled with cement and embedded in the concrete floor panel.

FIG. 4 is an enlarged plan view of the panel reinforcing form and illustrates diagrammatically the entrance nozzles for cement placed at one end of the form and the air vents placed at the other end.

FIG. 5 is a front elevation of a reinforced concrete and prestressed wall panel.

FIG. 6 is a side elevation when looking at the right hand side of FIG. 5.

FIG. 7 is a rear elevation of the concrete panel shown in FIG. 5.

FIG. 8 is an enlarged transverse section taken along the line 8—8 of FIG. 7.

FIG. 9 is a still greater enlarged section illustrating how two adjacent wall panels are permanently joined together.

FIG. 10 illustrates how a concrete wall panel is mortared into a groove in a concrete foundation and how the same foundation supports a concrete floor panel.

FIG. 11 is a front elevation of a concrete wall panel shaped so as to provide a part of a window or door opening.

FIG. 12 is a rear elevation of the concrete wall panel illustrated in FIG. 11.

FIG. 13 is a vertical section taken along the line 13—13 of FIG. 11.

FIG. 14 is a transverse section taken along the line 14—14 of FIG. 11.

FIG. 15 is a modification of a panel reinforcing metal form shown on the same scale as FIG. 4 and illustrates additional tensioning wires or rods secured to certain portions of the form.

FIG. 16 is a transverse section taken along the line 16—16 of FIG. 15.

FIG. 17 is another modification of a panel reinforcing metal form made from a single tubular member bent in a particular manner.

DESCRIPTION OF THE PREFERRED EMBODIMENTS

In carrying out my invention I will first describe the reinforced concrete floor panel A illustrated in FIGS. 1 and 3. The panel reinforcing metal form B, per se, is shown on a larger scale in the plan view of FIG. 4, and it is placed in a floor panel-forming mold C, in FIG. 2 prior to the pouring of concrete to embed the metal form. The enlarged transverse section of FIG. 3 illustrates the completed concrete floor panel after the concrete has set and just before the panel A is removed from the mold C.

The hollow reinforcing metal form B, see FIG. 4, can take any desired shape according as to what the contour of the concrete casting is to be. I have shown a concrete floor panel A by way of example and the reinforcing form for this comprises three, spaced apart and parallel, hollow metal tubular members, 1, 2 and 3, each being preferably rectangular in cross section, see FIG. 3. The tubular members 1 and 2 are interconnected by elbows 4 and 5, placed at the ends of the member 1 and connected to transverse tubular members 6 and 7, respectively, the latter in turn being connected to the member 2 by T-shaped hollow connectors 8 and 9. Additional transverse tubular members 10 and 11 connect the T-shaped members 8 and 9, respectively, to elbows 12 and 13 that communicate with the ends of the tubular member 3. This completes the reinforcing metal form B. All of the tubular members 1, 2 and 3, and the transverse tubular members 6, 7, 10 and 11, are provided with external ribs 14 for a purpose hereafter described.

It will be noted from FIG. 4 that the elbows 4 and 12 and the T-shaped member 8 have inlets 15 through which cement may be injected into the hollow interior of the form B. At the opposite end of the form I provide air vents 16 for the elbows 5 and 13 and the T-shaped member 9. The tensile strength of the metal tubing of the form B is about 65,000 to 70,000 p.s.i. The form is preferably heat treated and this will increase the tensile strength to about 110,000 to 125,000 p.s.i. The interior of the form B is then filled with cement to a pressure about 100 to 300 p.s.i. The air vents 16 may have screw plugs, not shown, that can be closed when the cement starts to escape through the vents and then the cement pressure can be built up to the desired amount before the inlets 15 are clamped shut. The internal cement pressure will stretch the tubes but the cement will contract when it sets and provide sufficient space for the metal tubes to return to their normal sizes.

The form B may have one or more inlets 15 which may be valve-controlled rather than clamped shut for closing them and it may have one or more air outlets 16 that also may be valve-controlled rather than closed by screw plugs so as to insure the building up of the internal pressure of the cement within the hollow form to the desired extent. The entire interior of the form is preferably filled with the cement when the cement sets and the tubes have returned to normal size.

FIG. 2 shows the metal reinforcing form B placed within the floor panel mold C preparatory to the mold receiving the concrete. FIG. 3 shows an enlarged cross section through the mold C after the concrete 17 has filled it. The interior of the hollow form B is also shown filled with cement 18. The floor panel forming mold C can take various shapes. I have shown the bottom board 19 of the mold provided with a pair of arched portions 20 and 21 and these will form hollowed-out portions in the floor panel A that extend substantially the entire length of the panel, see FIG. 1. The side walls 22 and 23 of the mold are removable from the bottom board 19 when freeing the concrete floor panel A from the mold. It will be noted that the interior surface of the side wall 22 has a longitudinal rib 22a thereon for forming a longitudinal groove in the adjacent side of the concrete panel. Also, the other side wall 23 of the mold C has a longitudinal groove 23a therein for forming a longitudinal rib in the adjacent side of the concrete floor panel. A reinforcing wire screen 24, indicated by the horizontal row of dash lines in FIG. 3, may be placed in the mold C and embedded in the concrete 17 so as to lie below and parallel the top surface of the floor panel A. A top board 25 covers the mold C.

The metal reinforcing form B is preferably heated to a temperature of 100–150° F. before the concrete 17 is poured into the mold so as to embed the form. The steel form B will elongate to a greater extent than the cement 18 that is contained within the interior of the frame. The concrete 17 is connected to the form B by the external ribs 14 on the form and the concrete will set before the temperature of the form returns to ambient temperature. The steel form B has expanded to a greater extent than the cement 18 within the interior of the form when the form is heated above ambient temperature and, therefore, the cement will not interfere with the form contracting when it returns to ambient temperature. The ribs 14 and the form B will prestress the concrete floor panel A when the form returns to the ambient temperature. An epoxy could be used on the exterior surface of the form B, in addition to or in place of the ribs 14 in order to cause the concrete 17 to adhere to the walls of the form and be pretensioned by the contracting of the form as the latter returns to ambient temperature. In this way the metal form B will reinforce the floor panel A as well as prestress it. The epoxy would be applied as a thin layer on the exterior surfaces of the form B, and the scale showing of FIGS. 2 and 4 is too small to indicate the thickness of the epoxy layer by a double line. Therefore the single lines representing the outer surfaces of the form B, can also represent the epoxy layer.

FIG. 1 shows a bottom plan view of the completed floor panel A. After the panel concrete 17 has set, the mold cover 25 is removed and then the side walls 22 and 23, see FIG. 3, after which the panel may be removed from the bottom board 19 of the mold C. The operation is repeated when casting the next concrete floor panel. A transverse section through a portion of the floor panel A is shown in FIG. 10 in its association with a concrete wall panel.

In FIG. 17, I disclose another type of a panel reinforcing tubular metal frame, indicated generally at L. This frame is made from a single metal tube that is preferably rectangular in cross section. The tube is bent so that the frame L will have a central tubular portion 70, two side portions 71 and 72 that parallel the central portion 70, and two end portions 73 and 74. The tube has an inlet nozzle 75 that communicates with the entrance end of the tube. It should be noted that the end portion 73 of the reinforcing frame L is composed of two shorter lengths of the tube with the entrance end of the tube being welded at 76 to the adjacent short length 73 at the rounded corner that interconnects tube portions 70 and 73 together. The inlet nozzle 75 extends at right angles to the entrance end of the tube.

The outlet end of the tube is closed by welding it at 77 to the adjacent mid portion of the end 74 of the frame L, clearly shown in FIG. 17. The tube is provided with a threaded opening in the central tube portion 70 that is disposed adjacent to the weld 77 and the threaded opening receives a screw plug 78. In actual practice the interior of the tube that forms the reinforcing frame L is filled with cement by forcing the cement into the tube interior through the inlet nozzle 75. The screw plug 78 is temporarily removed so as to permit air in the tube to escape. When the cement fills the tube and starts to escape through the threaded opening, the operator closes the opening by the screw plug 78. He then continues forcing additional cement into the tube through the inlet nozzle 75 until an internal pressure of about one to three hundred pounds is built up. The tubular inlet nozzle 75 is clamped shut when this internal pressure is reached by a tool, not shown. This tool can be a pair of pliers that can clamp the nozzle shut at a position adjacent to the frame end 73 and then a standard metal cutting shear can be used to cut off any nozzle portion that extends beyond the clamped end.

The reinforcing frame L, shown in FIG. 17, can be used instead of the reinforcing frame B, shown in FIG. 4, and it will reinforce and prestress the floor panel A or the wall panel D. In place of the external ribs 14 on the frame B, the frame L has drops 79 of an epoxy spaced at intervals and this epoxy will cause the concrete that encloses the frame L, to adhere thereto. The method of casting the concrete around the frame L is the same as that described for enclosing the frame B in casting the floor panel A, or the wall panel D.

One form of concrete wall panel is illustrated in FIGS. 5 to 10 inclusive. This panel is similar to the concrete floor panel in many respects and therefore similar parts will be given like reference numerals or letters and will not again be described in detail. A front elevation of the concrete wall panel D is shown in FIG. 5 and the reinforcing and prestressing frame B is indicated by dotted lines in this figure. FIG. 6 illustrates a side elevation and FIG. 7 shows a rear elevation of the same panel. The enlarged transverse section through the wall panel illustrated in FIG. 8, shows it having a groove 30 along the right hand side and a tongue 31 along the left hand side. This figure as well as FIG. 7 shows nailing strips 32 embedded in the concrete 17 and exposing one surface on the back side of the panel. The wall panel has a lower end portion 33, see FIGS. 5, 6, 7 and 10 that is reduced in thickness and is coextensive with the widths of the panel. Horizontal shoulders 34 and 35 are formed in the panel at the juncture of the reduced lower portion 33 with the remainder of the panel. FIG. 10 illustrates a cross section through a concrete foundation E, and this foundation has a horizontal groove 36 for receiving the reduced lower portion 33 of the wall panel. Mortar, not shown, secures the wall panel reduced lower portion 33 to the foundation. The panel is provided with openings 37, see FIG. 10, that extend transversely through the thicker sides and central vertical rib of the panel, and these can receive utility conduits for wiring 37', water pipes, etc.

It is possible to bolt adjacent wall panels together and this is shown in FIGS. 5 to 9 inclusive. Horizontally aligned and transversely extending bolt-receiving openings 38 and 39 are provided in the vertical side ribs 40 and 41, respectively, that are on the rear surface of the wall panel. These openings may be lined with metal tubing if desired. When two adjacent wall panels are brought together, the tongue 31 of one panel will be received in the groove 30 in the adjacent panel and mortar may be placed between the abutting surfaces of the two panels for making a water-tight joint therebetween. Bolts F are inserted in the aligned openings 38 and 39 and the bolt head 42, see FIG. 9, will bear against a shoulder 43 provided in the side rib 41 of one of the panels while the nut 44 bears against a shoulder 45 provided in the rib 40 of the adjoining panel. An interior finishing board G may be secured by nails or the like to the nailing strips 32 carried by the panels. The floor panel A, in FIG. 10, is shown being supported by the foundation E and abutting the wall panel D. Any type of flooring material 46 may be applied to the upper surface of the floor panel.

A wall panel for a door or window opening is illustrated at H in FIGS. 11 to 14 inclusive. This wall panel is similar to the wall panel D shown in FIGS. 5 to 10 inclusive, except that it has a recess 50 for receiving a corner of a window frame, not shown. This necessitated the altering of the panel reinforcing frame J slightly from the reinforcing frame B shown in FIGS. 1 to 4 inclusive. The frame J has a rectangular portion 51 that has a height substantially coextensive with the height of the panel J and a width substantially equal to the width at the top of the panel that extends to the panel recess 50. The frame J has an offset reinforcing portion 52, see FIGS. 10 and 11 that has a height substantially equal to the distance from the bottom of the panel to the horizontal edge of the panel recess 50.

The method of forming the wall panel J is the same as that set forth in forming the floor panel A, and the wall panel D. The interior of the reinforcing frame J is filled with cement under pressure and the concrete is cast around the frame while the latter is at a higher than atmospheric temperature. Then, when the concrete sets and the frame is allowed to cool to the ambient temperature, the contracting of the frame will pretension the concrete forming the panel H.

In certain cases it may be necessary to add reinforcing rods to the reinforcing frame. Referring to FIGS. 15 and 16, I show a reinforcing frame K that is similar to the reinforcing frame B. In addition, the tubular members 1 and 3 are interconnected by tensioning rods or elongated bolts 60. These tubular members 1 and 3 have upstanding eyelets 61 whose openings receive the elongated bolts 60. The bolt head 62 bears against one eyelet and the nut 63 bears against the other eyelet. A tightening of the nuts 63 will place the bolts 60 under the desired tension. In like manner the transverse hollow tubes 6 and 7 have integral ears or eyelets 64 interconnected by an elongated tensioning bolt 65 and the transverse tubes 10 and 11 have integral ears or eyelets 66 interconnected by an elongated tensioning bolt 67. These tensioning bolts 65 and 67 can apply the desired tension between the transversely extending tubular members 6, 7 and 10 and 11.

I claim:
1. The method of constructing a reinforced and prestressed concrete building panel which consists in:
  (a) filling a tubular reinforcing metal form with cement under pressure and allowing the cement to set;
  (b) placing said form in a panel forming mold and heating said form and cement above ambient temperature to expand the form to a greater extent than the cement therewithin;
  (c) pouring concrete into the mold for embedding the form while still maintaining the form temperature at higher than ambient temperature until the concrete has set; and
  (d) permitting the form temperature to return to ambient temperature so as to contract the form, the form in contracting placing the concrete under tension for pretensioning the concrete panel in which it is embedded.
2. The method of constructing a reinforced and prestressed concrete building panel which consists in:
  (a) filling a tubular reinforcing metal form with cement under pressure for expanding it and then allowing the cement to set, the cement in setting contracting in bulk and permitting said form to return to normal size;
  (b) heating said metal form and cement to expand both, the form expanding to a greater extent than the cement, and placing the form in a mold while still in a heated and expanded condition;
  (c) filling the mold with concrete while embedding the form in the concrete, the form and the cement still being hot and expanded; and in
  (d) permitting the concrete to set and the form and cement to return to ambient temperature;
  (e) whereby the form will tend to contract and pretension the set concrete in which it is embedded.

References Cited

UNITED STATES PATENTS

| 2,335,433 | 11/1943 | Minck | 52—293 |
| 3,167,882 | 2/1965 | Abbott | 52—230 |

FOREIGN PATENTS

| 170,097 | 1/1952 | Austria | 52—223 |
| 1,123,209 | 8/1968 | Great Britain | 52—223 |
| 710,718 | 6/1965 | Canada | 264—228 |
| 759,688 | 5/1967 | Canada | 52—274 |
| 522,510 | 4/1931 | Germany | 52—223 |
| 857,269 | 8/1952 | Germany | 52—736 |

HENRY C. SUTHERLAND, Primary Examiner

J. L. RIDGILL, Assistant Examiner

U.S. Cl. X.R.

52—223, 274, 602